(12) United States Patent
Subrahmanya

(10) Patent No.: US 8,620,357 B2
(45) Date of Patent: *Dec. 31, 2013

(54) METHOD AND APPARATUS OPTIMIZING RECEIPT OF CALL/BROADCAST PAGING MESSAGES BY SELF-POWERED WIRELESS COMMUNICATIONS DEVICES

(75) Inventor: Parvathanathan Subrahmanya, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/331,034

(22) Filed: Dec. 20, 2011

(65) Prior Publication Data

US 2012/0149402 A1    Jun. 14, 2012

Related U.S. Application Data

(62) Division of application No. 12/717,891, filed on Mar. 4, 2010, now Pat. No. 8,155,676, which is a division of application No. 10/756,160, filed on Jan. 12, 2004, now Pat. No. 7,715,855.

(51) Int. Cl.
*H04W 68/02* (2009.01)
(52) U.S. Cl.
USPC .......................................... 455/458; 340/7.32
(58) Field of Classification Search
None
See application file for complete search history.

(56) References Cited

U.S. PATENT DOCUMENTS

| | | | |
|---|---|---|---|
| 5,481,537 A | 1/1996 | Crisler et al. | |
| 5,826,173 A | 10/1998 | Dent | |
| 5,870,673 A | 2/1999 | Haartsen | |
| 5,898,904 A | 4/1999 | Wang | |
| 5,918,170 A | 6/1999 | Oksanen et al. | |
| 6,157,815 A | 12/2000 | Collins et al. | |
| 6,477,382 B1 | 11/2002 | Mansfield et al. | |
| 6,711,413 B1 | 3/2004 | Heidari | |

(Continued)

FOREIGN PATENT DOCUMENTS

| CN | 1171188 A | 1/1998 |
|---|---|---|
| JP | 9322218 | 12/1997 |

(Continued)

OTHER PUBLICATIONS

European Search Report—EP10176214, Search Authority—Munich Patent Office, Nov. 12, 2010.

(Continued)

*Primary Examiner* — Kashif Siddiqui
(74) *Attorney, Agent, or Firm* — S. Hossain Beladi

(57) ABSTRACT

A wireless communications network (120) responds to each incoming call placed to a wireless communications device (134) by transmitting a call-paging message (418) within a corresponding partition of a digital radio frame of prescribed format. Responsive to each occurrence of a broadcast event (404), the network transmits (414) a repeating broadcast-paging message announcing the availability of broadcast content from the network. The broadcast-paging message is transmitted multiple times within each digital radio frame. Another sequence (500) describes WCD operation in this network. Responsive to wakeup (502) from sleep, the WCD detects (509) received signal quality. The WCD also receives (510) scheduled network transmission of a call-paging message and a number of instances (at least one) of a repeating network transmitted broadcast-paging message that occurs multiple times for each scheduled transmission of the call-paging message. This number varies inversely with the detected signal quality.

20 Claims, 6 Drawing Sheets

(56) References Cited

U.S. PATENT DOCUMENTS

| | | |
|---|---|---|
| 6,907,028 B2 | 6/2005 | Laiho et al. |
| 7,047,050 B1 | 5/2006 | Khawand et al. |
| 7,715,855 B2 | 5/2010 | Subrahmanya |
| 8,155,676 B2 | 4/2012 | Subrahmanya |
| 2003/0119452 A1 | 6/2003 | Kim et al. |
| 2003/0153369 A1 | 8/2003 | Laiho et al. |
| 2004/0091022 A1* | 5/2004 | Sarkar et al. ............ 375/147 |
| 2012/0149403 A1 | 6/2012 | Subrahmanya |

FOREIGN PATENT DOCUMENTS

| | | |
|---|---|---|
| JP | 10135893 A | 5/1998 |
| JP | 10327460 | 12/1998 |
| JP | 11112405 | 4/1999 |
| JP | 11331896 | 11/1999 |
| JP | 2000174689 A | 6/2000 |
| JP | 2003188818 | 7/2003 |
| JP | 2005526460 A | 9/2005 |
| JP | 4550834 | 9/2010 |
| WO | WO03094389 | 11/2003 |
| WO | WO03096578 A1 | 11/2003 |

OTHER PUBLICATIONS

European Search Report, EP07012052—International Search Authority—Munich—Jul. 18, 2008.

European Search Report, EP08016211—Search Authority—Munich, Nov. 27, 2008.

International Preliminary Report on Patentability, PCT/US2005/000822—International Search Authority—US, Oct. 3, 2006.

International Search Report, PCT/US2005/000822—International Search Authority—European Patent Office, Aug. 22, 2005

Translation of Office Action in Japan application 2010-111292 corresponding to U.S. Appl. No. 12/717,891, citing JP4550834 dated Mar. 3, 2011.

Written Opinion PCT/US2005/000822, International Search Authority European Patent Office , Aug. 22, 2005.

* cited by examiner

METHOD AND APPARATUS OPTIMIZING RECEIPT OF CALL/BROADCAST PAGING MESSAGES BY SELF-POWERED WIRELESS COMMUNICATIONS DEVICES

CLAIM OF PRIORITY UNDER 35 U.S.C. §120

The present Application for Patent is a divisional of U.S. patent application Ser. No. 12/717,891 entitled "METHOD AND APPARATUS OPTIMIZING RECEIPT OF CALL/BROADCAST PAGING MESSAGES BY SELF-POWERED WIRELESS COMMUNICATIONS DEVICES" filed Mar. 4, 2010, now U.S. Pat. No. 8,155,676, which is a divisional of U.S. patent application Ser. No. 10/756,160 entitled "METHOD AND APPARATUS OPTIMIZING RECEIPT OF CALL/BROADCAST PAGING MESSAGES BY SELF-POWERED WIRELESS COMMUNICATIONS DEVICES" filed Jan. 12, 2004, now U.S. Pat. No. 7,715,855, each of which patent applications is assigned to the assignee hereof and are each hereby expressly incorporated by reference herein.

BACKGROUND

1. Field

The present invention generally relates to wireless communications networks, wireless communication devices participating in such networks, and the operation of the foregoing equipment. More particularly, the invention concerns a new technique for base stations to transmit call/broadcast paging messages to wireless communications devices, and a consequently more efficient technique for such devices to receive call/broadcast paging messages.

2. Background

Mobile phone designers are faced with a variety of different engineering challenges. One of the most perplexing problems is the necessity of using batteries to power the phone's transceiver, speaker, microphone, display, and other electronics. A battery can only provide a finite amount of power until exhaustion, at which time the phone ceases to work. Of course, most mobile phone batteries are rechargeable, but this requires access to a power source.

Mindful of this vulnerability, mobile phone designers have engineered their products with various low power states. In the absence of any outgoing or incoming calls, or during extended periods of inactivity in a data call, a mobile phone is typically in an "idle" state. At times, some phone models enter a "sleep" state where the phone selectively disables circuitry such as its transceiver, central processor, and certain other hardware. At this point, the phone consumes hardly any current. At periodic intervals that are preset by the network, the phone briefly awakens, chiefly to receive call paging messages (if any) from base stations alerting the phone to incoming calls, and additionally for other reasons such as searching for pilot signals of nearby base stations, etc. When the mobile phone cannot achieve communications with any base stations for some period of time, the phone enters a "deep sleep" state, during which the phone seeks service at very infrequent intervals and meanwhile powers-down to an even greater extent.

The foregoing operational states contribute significantly to conserving battery power. And, in some respects, this state of the art is completely satisfactory. Nonetheless, engineers at Qualcomm Corporation ("QUALCOMM") are continually seeking to new ways to reduce the power consumption of mobile phones. QUALCOMM engineers are also concerned with incorporating new mobile phone features without sacrificing previous achievements toward reducing mobile phone power consumption. In this respect, one area of possible focus concerns the proposed future network delivery of broadcast content to mobile phones. Those in the industry expect that actual delivery of broadcast programs to mobile phones will be preceded by broadcast paging messages, advising mobile phone users that the broadcast programs have become available.

Accordingly, in order to receive this added paging message, dormant mobile phones will have to extend their existing wakeup sequences, or worse, engage in an additional wakeup sequence. In either case, mobile phones will have to consume additional power in order to receive the added broadcast paging message. As explained above, engineers typically seek to minimize mobile phone power consumption. Therefore, certain problems are presented by the future need for mobile phones to additionally receive broadcast paging messages, in addition to the existing call paging messages.

SUMMARY

A wireless communications network responds to each incoming call placed to a wireless communications device by transmitting a call-paging message within a corresponding partition of a digital radio frame of prescribed format. Responsive to each occurrence of a broadcast event, the network transmits a repeating broadcast-paging message announcing the availability of broadcast content from the network. The broadcast-paging message is transmitted multiple times within each digital radio frame.

Another sequence describes WCD operation in this network. Responsive to wakeup from sleep, the WCD detects received signal quality. The WCD also receives scheduled network transmission of a call-paging message and a number of instances (at least one) of a repeating network transmitted broadcast-paging message that occurs multiple times for each scheduled transmission of the call-paging message. This number varies inversely with the detected signal quality.

DETAILED DESCRIPTION

The nature, objectives, and advantages of the invention will become more apparent to those skilled in the art after considering the following detailed description in connection with the accompanying drawings.

Hardware Components & Interconnections

Introduction

The present disclosure utilizes a wireless communications network with various base stations and WCDs, among other components. The base stations transmit call-paging messages advising the WCD of incoming voice/data calls. The base stations also transmit broadcast-paging messages advising the WCDs of broadcast programs that are available for the WCDs to download, i.e., on-demand broadcast content. Base stations transmit the call/broadcast paging messages in such a manner (discussed below) to facilitate power-efficient receipt by WCDs. Relatedly, the WCDs are programmed to utilize these features in order to receive the call/broadcast paging messages while consuming a minimum amount of electrical power.

Further detail is provided below concerning the overall design and operation of this system, as well as its various components.

Wireless Communications Network

Figure 1A:
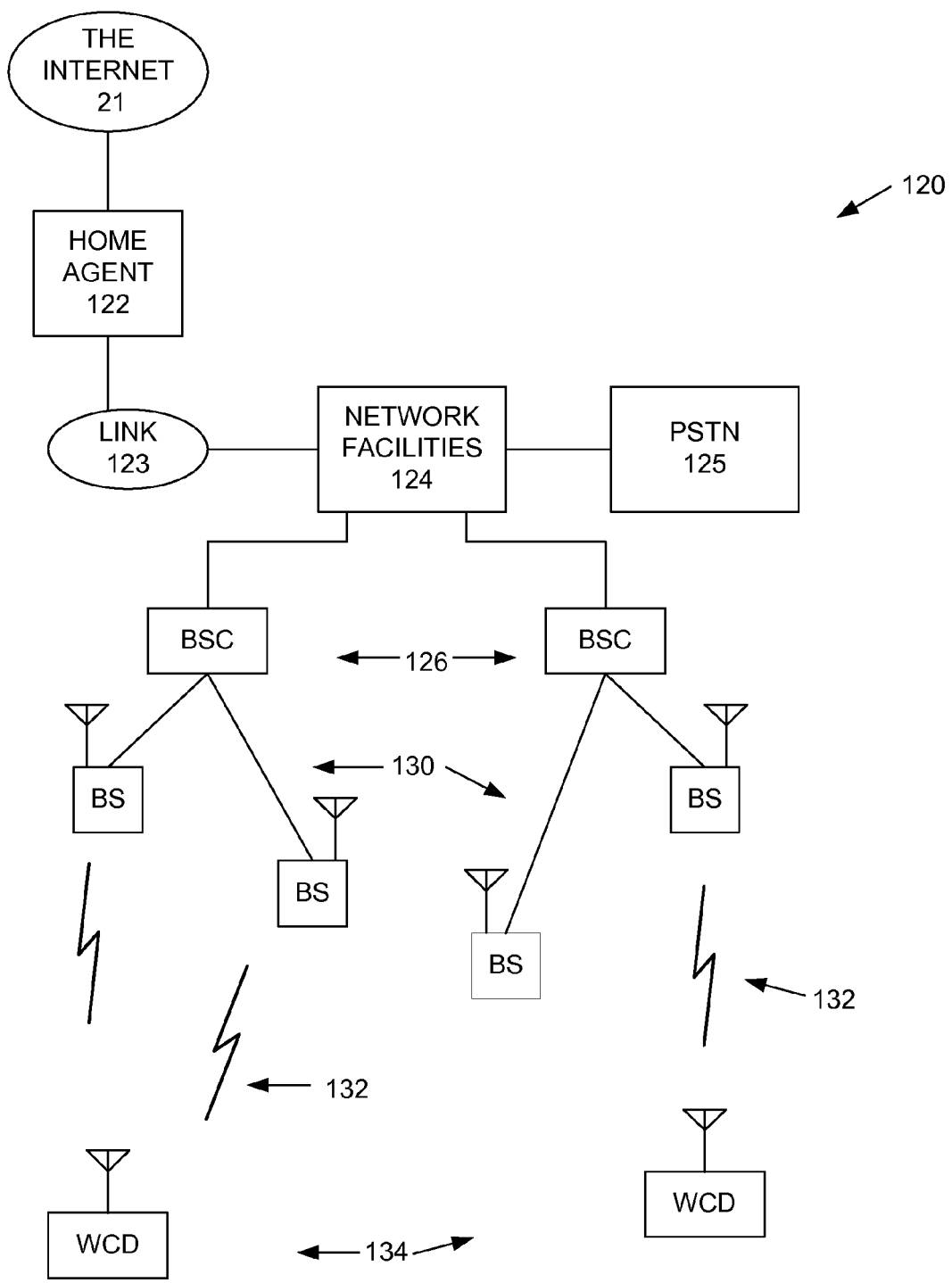
FIG. 1A is a block diagram of some hardware equipment of a wireless communications network.

FIG. 1A illustrates a highly simplified model of an exemplary wireless communications network 120. In one embodiment, the network 120 may be implemented as a Telecommunications Industry Association (TIA) IS-95 type network. This type of network, for example, is useful for WCDs to receive and place voice calls as well as to send/receive e-mail, surf the Internet, and exchange other digital data.

The network 120 includes various WCDs 134, which comprise CDMA compatible wireless telephones in this particular illustration. The WCDs may also be referred to as mobile stations, access terminals, subscriber stations, user equipment (UE), and other names. The WCDs 114 are served by various base stations 130, which exchange voice and/or packet data content with the WCDs 134.

Telephone calls and other voice communications are conducted by exchanging data between WCDs 134 and base stations 130 via radio frequency (RF) electromagnetic signal channels. Base stations may also exchange other types of information with the WCDs 134, such as call paging messages, origination messages, registration messages, pilot signal reports, and other digital data. In addition, digital content is conducted by exchanging internet protocol (IP) packet data between WCDs 134 and base stations 130 for relay to the Internet 121 or another packet data network. Packet data applications may run directly on the WCDs 134, or may run on a separate computer device that uses the WCD 134 as a wireless modem.

Some or all of the base stations 130 may be implemented using hardware such as that used by conventional base stations in commercial use today. Each base station 130 is coupled to a base station controller (BSC) 126, which conducts two-way information flow between base stations 130 and various network facilities 124 (described below). The BSCs 126 perform various functions that allow mobile communication to take place, including orchestrating the handoff of WCDs 134 between base stations. BSCs may also include a packet control function (PCF) module to exchange IP data packets with the base stations 130. Each BSC 126 may be implemented using hardware such as that used by conventional wireless networks in commercial use today, for example.

For use in processing voice calls and other related data, the network facilities 124 may include components such as a mobile switching center (MSC), mobile telephone switching office (MTSO), etc. A MSC component, for example, relays voice stream information between the BSCs 126 and the public switched telephone network (PSTN) 125. An MSC also operates to provide mobility control, call processing, and call routing functionality.

For use in processing digital data unrelated to voice calls, the network facilities 124 may include components such as one or more home and foreign agents. In this context, the network facilities 124 exchange IP data between the BSCs 126 and one or more home agents 122 via one or more links 123, such as wireless or wire-line T1 or T3 links, fiber optic connections, Ethernet, or other Internet Protocol (IP) connections. The home agent 122, in turn, is coupled to the Internet 121.

Wireless Communications Device

Figure 1B:
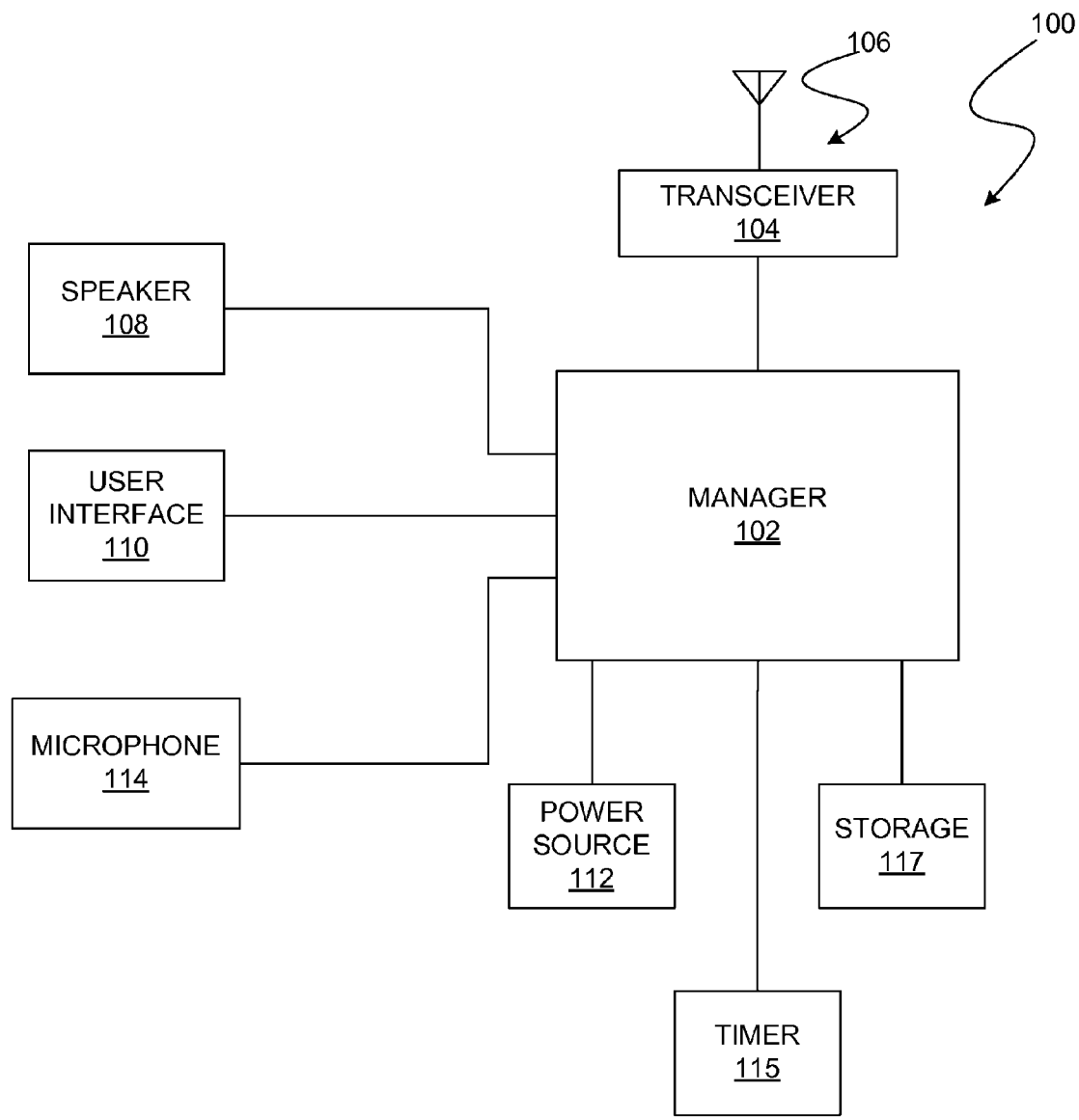
FIG. 1B is a block diagram of the hardware components and interconnections of a wireless communications device.

FIG. 1B illustrates the construction of an exemplary WCD 134 by depicting the makeup of a wireless telephone 100. The telephone 100 includes an antenna 106, transceiver 104, speaker 108, user interface 110, microphone 114, power source 112, timer 115, and storage 117, along with any other conventional circuitry that may vary depending upon the application. A manager 102, which may comprise an instruction-executing processor or digital logic circuitry (as discussed below), serves to manage operation of the other components as well as signal routing between these components.

The power source 112 comprises an electric battery, solar power source, biological power source, hand-crank, or other portable power supply. The timer 115 may comprise a hardware timer, software timer, or other appropriate timer. One especially power-efficient example of the timer 115 is a hardware timer such as circuitry that provides a hardware interrupt signal to the manager 102. Alternatively, software, firmware, or other timer constructs may be used. The storage 117 may comprise a hardware construct (such as volatile or non-volatile circuit memory, magnetic storage, etc.) or software construct (such as a register, byte, address, or other unit of storage).

Although a mobile wireless telephone 100 is illustrated, a WCD may be mobile or stationary. Furthermore, a WCD may comprise any data device that communicates through a wireless channel or through a wired channel, for example using fiber optic or coaxial cables. In addition to (or instead of) wireless and wireline phones, a WCD may be configured to implement various other devices including but not limited to PC card, compact flash, external or internal modem, etc.

Exemplary Digital Data Processing Apparatus

Various constructs may be used to implement the data processing entities of FIGS. 1A-1B. One example is a digital data processing apparatus, as exemplified by the apparatus 200 of FIG. 2.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, channel, interface, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement some or all of the various processing entities such as those mentioned above. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

OPERATION

Having described various structural features, some operational aspects of the present disclosure are now described.

Signal-Bearing Media

Figure 2:
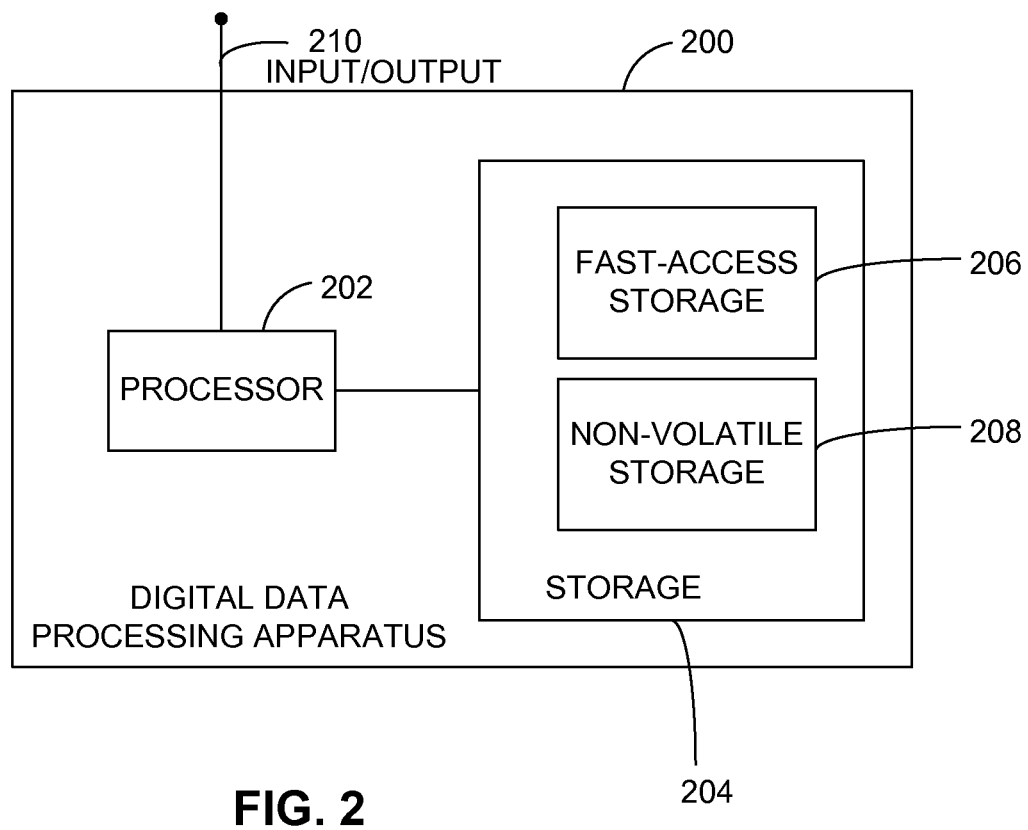
FIG. 2 is a block diagram of an exemplary digital data processing machine.
Figure 3:
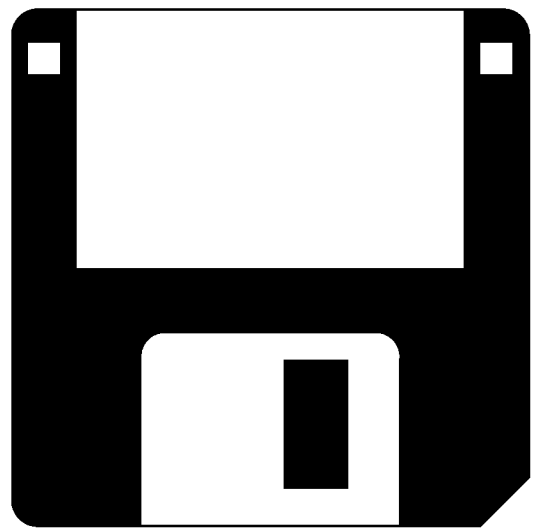
FIG. 3 is a plan view of an exemplary signal-bearing medium.

Wherever any functionality of the present disclosure is implemented using one or more machine-executed program sequences, such sequences may be embodied in various forms of signal-bearing media. In the context of FIG. 2, such a signal-bearing media may comprise, for example, the storage 204 or another signal-bearing media, such as a removable data storage product 300 (FIG. 3), directly or indirectly accessible by a processor 202. Whether contained in the storage 206, media 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, some or all of the present disclosure's functionality may be implemented using logic circuitry, instead of using a processor to execute instructions. Such logic circuitry is therefore configured to perform operations to carry out some or all of the method aspects of this disclosure. The logic circuitry may be implemented using many different types of circuitry, as discussed above.

Introduction to Operational Details

Figure 4:
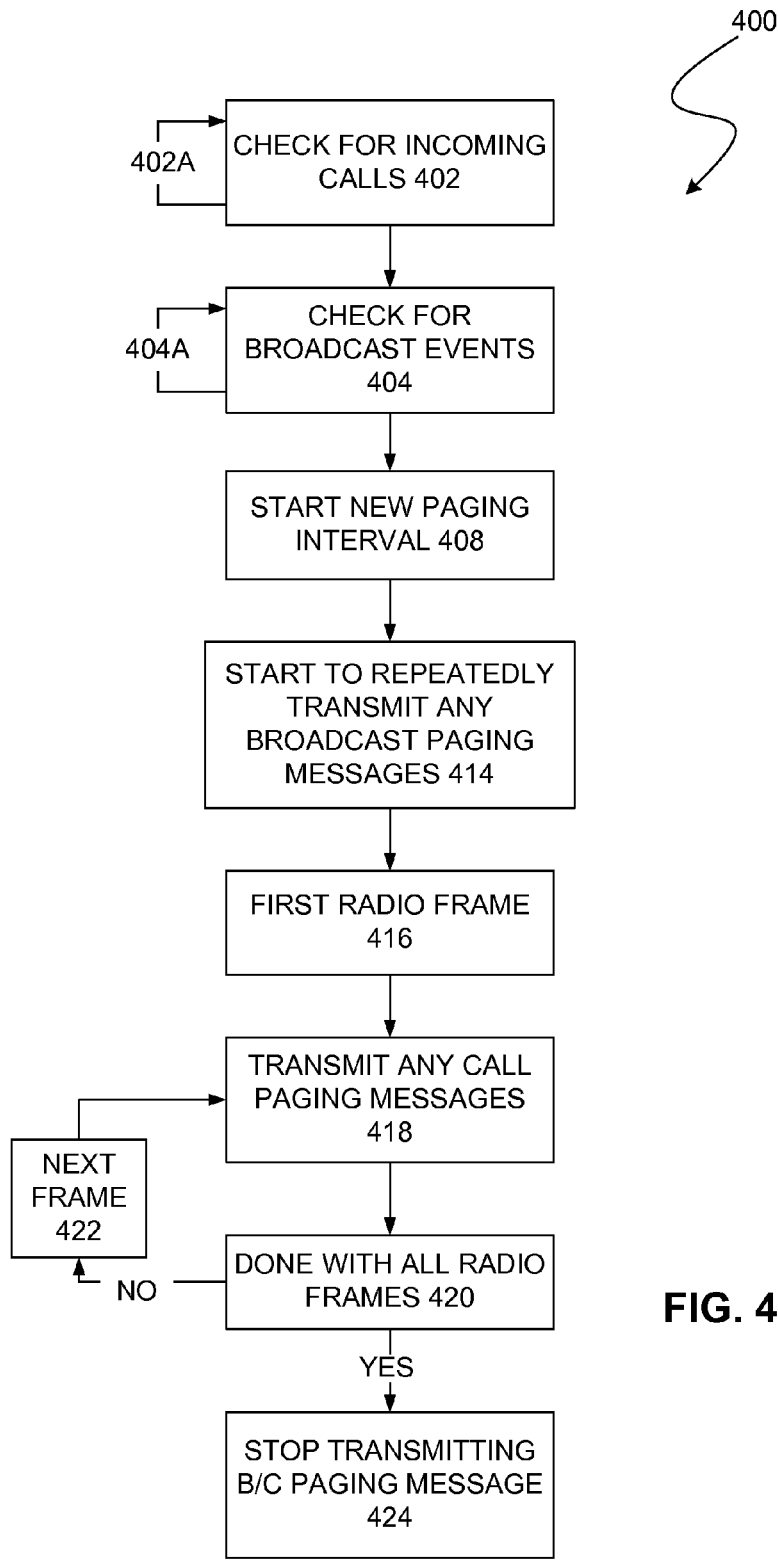
FIG. 4 is a flowchart illustrating a network sequence to transmit call-paging and broadcast-paging messages.

As mentioned above, an operational aspect of the present disclosure involves new techniques for network transmission of paging messages to WCDs (FIG. 4). A different but interrelated technique concerns a consequently more power efficient sequence for WCDs to receive paging messages (FIG. 5).

Terminology—Explanation of Signal Diagram

Figure 5:
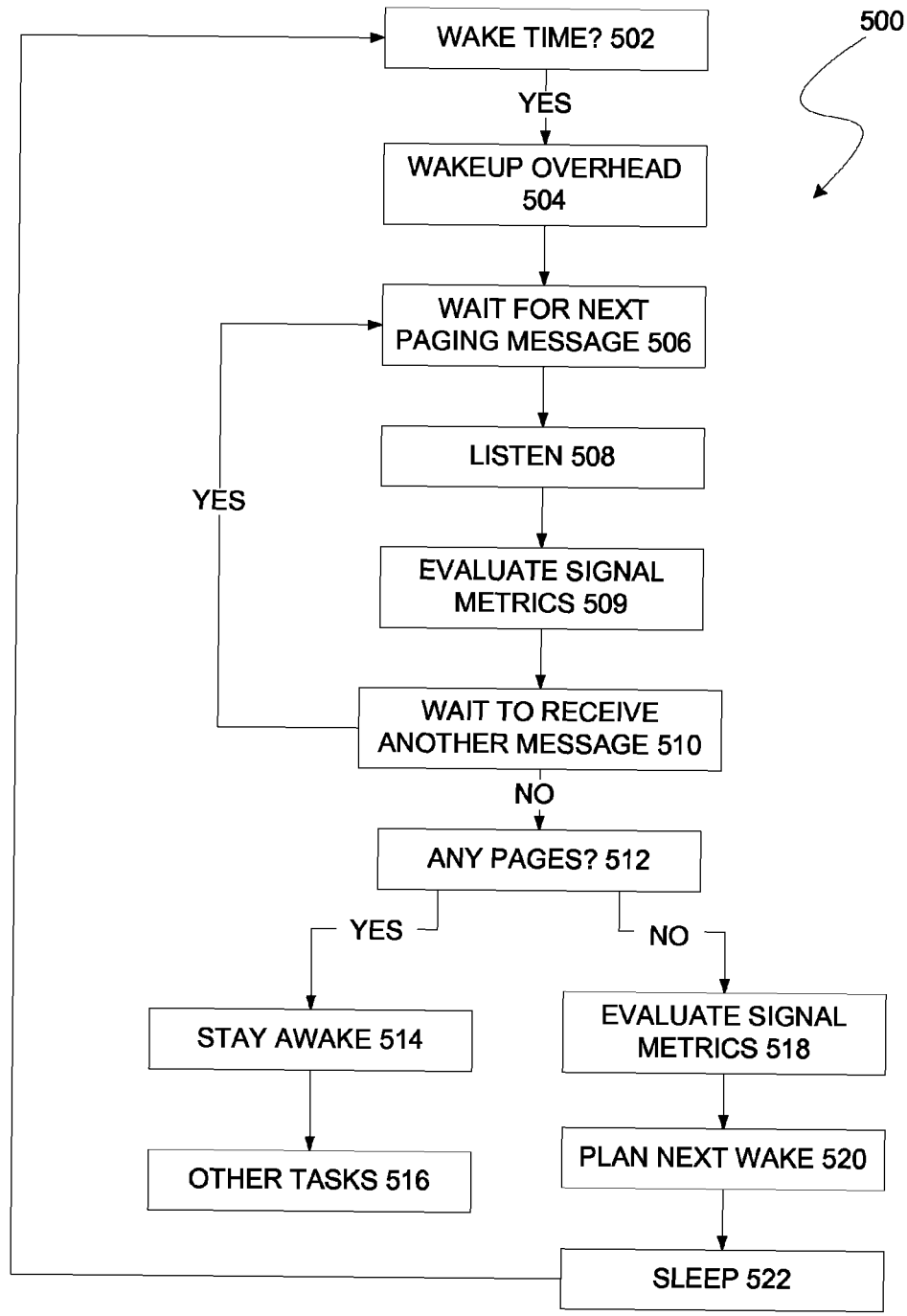
FIG. 5 is a flowchart illustrating a power-optimized sequence for a wireless communications device to receive call-paging and broadcast-paging messages.
Figure 6:
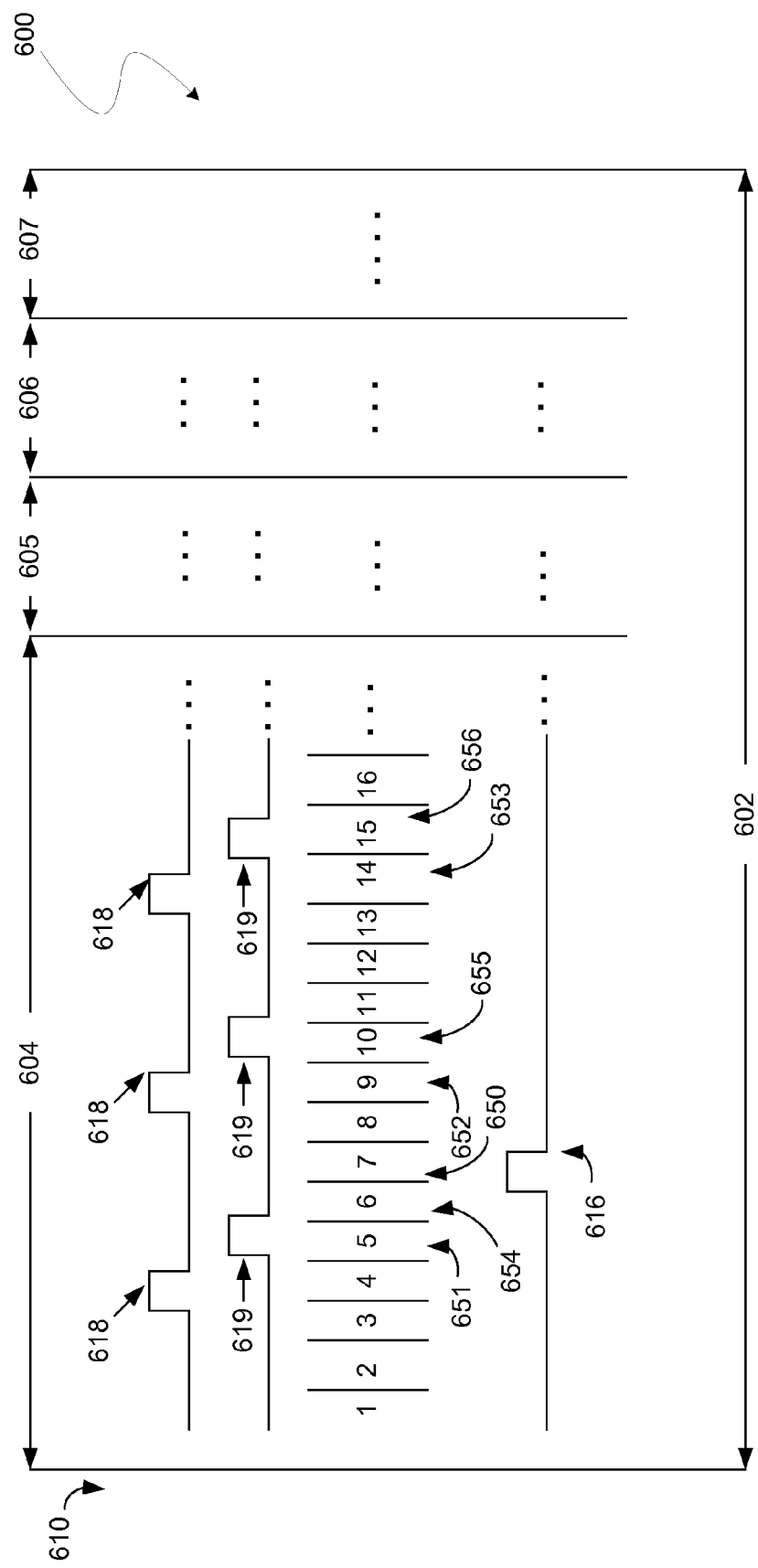
FIG. 6 is a signal diagram illustrating some exemplary paging messages.

In order to better understand FIGS. 4-5, a signal diagram 600 is first explained (FIG. 6). Broadly, and as described in greater detail below, 3GPP standard WCDMA (release 99) dictates that each base station send call-paging messages to its various WCDs during a carefully timed interval, which may last from 80 milliseconds to 5.12 seconds. This interval, herein called a "paging interval," is illustrated by 602 in regard to a representative ("subject") base station. "Call-paging" as used herein refers to pages for incoming voice (or data) calls, as well as pages to indicate imminent network-initiated data activity following an extended period of data inactivity when the WCD is "connected" to a wireless packet data network.

Paging data is transmitted in the form of multiple "radio frames." Digital communication frames are known in CDMA and other relevant disciplines, and many such examples of such frames are discussed in the numerous U.S. patents assigned to QUALCOMM. In one example of the present disclosure, each radio frame occupies ten milliseconds. The paging interval 602 includes radio frames 604, 605, and others 607 (not to scale). The other 607 radio frames of the interval 602 are not shown in the interest of concise explanation. Each radio frame is further divided into segments referred to herein as "partitions." For example, various partitions 610 of the radio frame 604 are shown.

Each different partition 610 is reserved for the subject base station to transmit a call-paging message to a different group of one or more corresponding WCDs, which are assigned to that particular partition. Reference 616 shows a call-paging message associated with the partition 650 and its WCD(s).

In one example, the call-paging messages are binary, where one binary value indicates that one or more WCDs assigned to that call-paging message are being paged, and the other binary value indicates that none are being paged. Instead of a binary zero, for example, a null or absence of signal may be substituted. The network transmits detailed information about each incoming call in a separate overhead message or channel. This information is available for WCDs to learn more about their incoming calls, and even to resolve which WCD is receiving the call if multiple WCDs are assigned to the same partition.

As introduced by the present disclosure, the paging interval 602 contains a maximum of one call-paging message for each different WCD. In other words each WCD can only receive its call-paging message in an assigned one of the partitions 610. Yet, for each WCD's call-paging message, there are multiple instances of a repeating broadcast-paging message. As contemplated by a more detailed example, multiple instances of the broadcast-paging message may occur within each radio frame.

In the illustrated example, reference 618 shows a repeating broadcast-paging message that occurs multiple times in the radio frame 604; yet, in the radio frame 604 there is only a single occurrence of each WCD's call-paging message (such as 616, for the WCDs of the partition 650). In the illustrated example, the broadcast-paging message 618 occurs in partitions 651, 652, and 653. The illustrated relationship between call/broadcast paging messages ensures that the time period between each call-paging message (such as 616) and the nearest broadcast-paging message (618) cannot exceed a predetermined maximum length of time. This novel feature is used to help WCDs conserve power, as discussed in greater detail below.

In the illustrated example, the broadcast-paging message 618 pertains to one set of broadcast programs or services. Optionally, another broadcast-paging message 619 may be provided, pertaining to a different set of broadcast programs. For instance, one broadcast-paging message may represent CNN and MSNBC programs, whereas another broadcast-paging message represents ESPN broadcast content. Instances of the broadcast-paging message 619 occur in partitions 654, 655, and 656 of the radio frame 604. As shown, the broadcast-paging messages 618, 619 are interlaced. As with the broadcast-paging message 618, the illustrated relationship between call-paging message 616 and broadcast-paging messages 619 minimum ensures that the time between the call-paging message and the nearest broadcast-paging message cannot exceed the predetermined maximum length of time.

Operation—Network Transmission of Call/Broadcast Paging Messages

FIG. 4 depicts some network operations 400 related to the present disclosure. Without any intended limitation, the operations 400 are illustrated in the specific context of the hardware of FIGS. 1A-1B. As illustrated, the operations 400 are performed independently by each base station 130. The following description concerns the operations 400 as performed by one representative ("subject") base station. Without departing from the scope of the present disclosure, however, certain tasks in the sequence 400 may actually be conducted by hierarchically superior components of the network 120, with the results being passed down to the base stations in the form of status updates or commands. This may centralize certain actions, avoiding the need for duplicating the same steps at all base stations.

In step 402, the subject base station 130 determines whether a pertinent incoming voice/data call is occurring. The incoming call is pertinent if it is directed to a WCD that (1) is in communication with that base station, (2) resides in the base station's coverage area, (3) has designated the subject base station as "primary," or (4) has another specified relationship with the base station. One example of step 402 comprises a "pull," where the base station queries other components of the network 120 to determine whether there are any incoming calls for WCDs that are pertinent to the base station. In another example, step 402 is a "push," where the base station receives notification whenever there are any incoming calls for pertinent WCDs. Step 402 is repeated continually, periodically, or according to another appropriate schedule, as shown by 402a. Accordingly, step 402 may be performed in parallel with subsequent step 404 and onwards.

In step 404, the subject base station 130 determines whether a "broadcast event" has occurred. A broadcast event comprises a network-assigned direction to notify WCDs of a particular broadcast program. For example, a broadcast event occurs when new broadcast content becomes available, for example, arrival of a news story, sports highlight, or music video. A broadcast event may also occur when the network mandates a second, third, or other repeated notification of given broadcast content. In a "pull" example, step 404 comprises the base station's active query of other components in the network 120 to determine whether WCDs should be initially notified (or re-notified) of any particular broadcast programs. In a "push" example, step 404 is a passive operation of the base station receiving notification messages whenever the network announces, schedules, or otherwise establishes a broadcast event. Step 404 is repeated continually, periodically, or according to another appropriate schedule, as shown by 404a. Accordingly, step 404 may be performed in parallel with subsequent steps 406 and onwards.

Step 408 begins a new paging interval. Broadly, and as described in greater detail below, each base station sends call-paging messages to its WCDs during a paging interval. Under the 3GPP WCDMA (release 99) standard, the paging interval may last from 80 milliseconds to 5.12 seconds. Since CDMA communications occur in the format of radio frames, the paging interval actually occupies a number of radio frames. Each radio frame, in one example, lasts for ten milliseconds. Accordingly, step 408 illustrates the beginning of this paging interval. Depending on the manner of implementing the network, different WCDs may be assigned completely different paging intervals. For example, WCDs that need access to low-latency network-initiated services may be assigned a short paging interval whereas WCDs receiving voice calls may be assigned much longer paging intervals.

As discussed above in conjunction with FIG. 6, each radio frame is divided into multiple segments, referred to herein as "partitions." As one example, an illustrative system may use 144 partitions per radio frame. Each partition may carry one call-paging message, which is applicable to one or multiple WCDs as pre-arranged by the network, carrier, etc. Therefore, each WCD is assigned a specific partition of a specific radio frame during which to receive its call-paging message, if any.

In addition to the call-paging operations as discussed above, the base station transmits a repeating broadcast-paging message during the paging interval. Multiple instances of the same broadcast-paging message are repeated throughout the paging interval in order to guarantee receipt by all WCDs, regardless of their assigned radio frame. Moreover, as explained below, the broadcast-paging message is repeated multiple times within each radio frame, in order to minimize the time between the partition where a given WCD's call-paging message occurs and the nearest preceding or subsequent broadcast-paging message. Moreover, as discussed above, there may be different broadcast-paging messages pertaining to different sets of broadcast content, although the present example is limited to one repeating broadcast-paging message for ease of explanation.

Step 414 begins repeated transmission of the broadcast-paging message. As discussed below, the base station transmits identical instances of the broadcast-paging message throughout the paging interval. The broadcast-paging messages and call-paging messages, in one example, may be transmitted in the same frequency band using different channelization codes. In one example, the broadcast-paging message comprises a bit or other abbreviated signal merely indicating to the WCDs within range whether broadcast content is available, with further information being available in a separately transmitted message. For example, a broadcast-paging bit of one means that new broadcast content is available, whereas a broadcast-paging bit of zero means that there is no new broadcast content.

As an example, the broadcast-paging message may be broadcast two, three or many more times per radio frame in order to minimize the time between that broadcast-paging message and the various call-paging messages occurring in the same radio frame. In other words, this limits the length of time between any given call-paging message and the nearest broadcast-paging message (preceding or following the call-paging message) to a predetermined maximum. For example, if the broadcast-paging message is broadcast twice during each 10 millisecond radio frame, this guarantees that the time between any given call-paging message and the nearest broadcast-paging message cannot exceed 2.5 milliseconds. This time may be reduced even further by repeating the broadcast-paging message three, four, or more times per radio frame.

Furthermore, in theory, the broadcast-paging message may be transmitted during each and every partition; however, spacing the message out gives other broadcast-paging messages (concerning different broadcast content) an equal opportunity to page the base station's WCDs during the intervening gaps. In a simplified example, where there are two different broadcast-paging messages, the network broadcasts one in radio frame partitions 5, 10, 15, 20, etc. The other is broadcast in radio frame partitions 6, 11, 16, 21, etc.

Also in theory, the base station may limit transmission of broadcast-paging messages to those partitions that are assigned to WCDs having an interest in that particular broadcast content. However, depending upon the network architecture, setup, and broadcast subscription arrangement, the network may be unaware of individual WCDs' broadcast subscriptions. Furthermore, two WCDs sharing the same partition could not be easily satisfied if they subscribe to different broadcast packages.

At any rate, ensuring temporal proximity between broadcast-paging and call-paging messages helps WCDs to save power by quickly resuming sleep in the event the call-paging and broadcast-paging messages are both negative.

After step 414, step 416 attends to a first radio frame of the current interval. Here, the base station transmits call-paging messages for all WCDs assigned to that radio frame (step 418). Each call-paging message occurs in a different partition of the subject radio frame. In the illustrated example, the call-paging messages comprise a bit or other abbreviated signal merely indicating to the WCDs within range that broadcast content is available for them, with further information being available in a separately transmitted message. For example, a call-paging bit of one means that an incoming call is occurring for some or all of the WCDs assigned to the current radio frame, whereas a call-paging bit of zero means that no incoming calls are occurring for WCDs assigned to this frame.

Next, step 420 asks whether the base station has completed all radio frames for the current paging interval. If not, step 422 advances to the next radio frame, and the base station then transmits call-paging messages for the WCDs assigned to that radio frame (step 418).

When all radio frames have been completed (step 420), the base station is finished transmitting call-paging messages for the current interval. Accordingly, the base station also stops transmitting the broadcast-paging message (step 424), and the current interval ends. A new interval later begins when step 424 returns to step 408, which occurs on a prescribed schedule. For increased broadcast-paging message reliability, the base station may optionally re-transmit the broadcast-paging message, not only over multiple radio frames, but over multiple paging intervals.

Operation—Wireless Communications Device

FIG. 5 depicts the WCD operations 500 related to receiving call-paging and broadcast-paging messages. Without any intended limitation, the operations 500 are illustrated in the specific context of the hardware of FIGS. 1A, 1B, and 4. As illustrated, the operations 500 are performed independently by each WCD. The following description concerns the operations 500 as performed by a representative ("subject") WCD.

In step 502, the WCD awakens from sleep. This entails the manager 102 leaving a reduced power state in response to a regularly scheduled hardware interrupt triggered by the timer 115, which is scheduled according to step 520 (below). Namely, the timer 115 starts the wakeup sufficiently in advance so that the WCD will be able to receive its call-paging message in the appointed radio frame and partition. In step 504, the WCD performs various wakeup overhead tasks involved in preparing its different RF, analog, and digital subsystems for receiving the call-paging message. Other wakeup overhead tasks may also be performed, such as boot-up, loading programs into memory, configuring hardware, etc. The details of entering/leaving sleep state are explained in a variety of issued and pending patent applications assigned to QUALCOMM.

In step 506, the manager 102 waits for the next call-paging or broadcast-paging message. Depending upon exactly when the WCD emerges from sleep (which may be specifically planned as discussed below), the first paging message to be received may be the call-paging message or one of the repeated broadcast-paging messages. In any case, the manager 102 receives this message in step 508. In the example where there are different broadcast-paging messages for different broadcast services, step 506's receipt of the broadcast-paging message involves receiving the broadcast-paging message pertinent to the WCD's particular subscription package.

In step 509, the manager 102 evaluates signal "metrics" of one or more prescribed signals from the network. This is used to determine how many times to listen to the broadcast-paging message during the sequence 506-510. For instance, if the broadcast-paging message was received once but signal strength/quality is poor, step 509 may decide to receive another instance of the message.

In one example of step 509, the measurement of signal metrics may comprise the manager 102 communicating with the transceiver 104 to measure the raw power arriving in the RF band upon which the WCD communicates. As a different example, step 509 may be performed by the manager 102 measuring raw power of the common pilot signal broadcast by one or more base stations in communication with the WCD. As still another example, the manager 102 may compute the signal-to-noise ratio of the common pilot signal. As still another example, the manager 102 may compute the signal-to-noise ratio of the paging message itself. In the signal metrics of step 509 utilize a common pilot signal as the sample signal, this step may be performed at a different time, such as before step 506. The labeling of signal metrics as "poor" or "good" may involve comparing signal metrics to a predetermined threshold, using a moving average, reviewing historical data specific to the subject WCD, or any other useful technique.

In step 510, the manager determines whether it must wait to receive another paging message. This is determined by the number of times step 506 has been performed, along with the results of step 509, discussed above. Optionally, signal metrics from the previous wakeup state (as performed by step 518) may be considered in addition or instead of the signal metrics of step 509. As one example of step 510, if the first performance of step 506 in the current wakeup state obtained the call-paging message, then step 510 would dictate repeating step 506 to obtain the broadcast-paging message, or vice versa. Also, even if both call-paging and broadcast-paging signals have been received, in step 510 the manager 102 may decide to receive another one or more instances of the broadcast-paging message in poor signal reception conditions (as measured during step 509, for example).

In a different example, if the signal reception conditions were poor during the previous wake-up state, the manager 102 may have scheduled (520, discussed below) a wake-up early enough to monitor one broadcast-paging message, the call-paging message, then another broadcast-paging message. After receiving the first broadcast-paging message (in step 506), if the manager 102 determines (step 509) that signal reception conditions have improved to the point that the reception of a single broadcast-paging message is sufficient, step 510 would conclude that the manager 102 does not need to stay awake after receiving the call-paging message to monitor the second instance of the broadcast-paging message.

When the manager does not need to obtain any further paging messages, step 510 advances to step 512. In step 512, the manager 102 branches either (1) to step 514 if step 506 revealed call and/or broadcast pages applicable to the subject WCD, or (2) to step 518 if step 506 did not reveal any pages for this WCD.

In the case of step 514, the manager 102 continues to stay awake and performs various other tasks 516 as required to process or respond to the recent pages. Namely, in the case of call-paging, the manager 102 obtains further information about the incoming call, answers the call, etc. In the case of broadcast-paging, the manager 102 contacts network equipment (or reviews other message content independently transmitted by the network) to obtain a description of the announced broadcast content, download the content itself automatically (in accordance with a default setting or previously specified user input) or manually (per user keypad or voice instructions), etc.

In contrast to the foregoing description, if the WCD did not receive call and/or broadcast pages in step 506, the manager 102 prepares for resumption of sleep. In step 518, the manager 102 evaluates signal metrics to determine how many times to listen to the broadcast-paging message (in step 506) before the next call paging message occurs. The measurement of signal metrics in step 518 may be performed in different ways, as discussed above in the context of step 509. After step 518, the manager 102 plans the next wakeup state (step 520). Namely, the manager 102 programs, sets, or otherwise configures the timer 115 to activate the manager 102 at the appropriate wakeup time. This utilizes information including (1) signal metrics, (2) the WCD's assigned call-paging time (e.g., partition), which is broadcast by the network on an appropriate overhead channel, fixed by the network or carrier when the WCD is activated, or otherwise established according to known procedures, and (3) the schedule of broadcast-paging messages, which may also be available via similar means.

As one example, in conditions of good signal metrics (as measured in step 518), the manager 102 may schedule wakeup so that the WCD completes step 504 at the last possible moment still permitting receipt of the call-paging message and the nearest (in time) preceding or following broadcast-paging message. This is possible where the WCD has awareness of the transmission schedule of the broadcast-paging messages, either through built-in programming of the WCD, receipt of overhead transmissions from the network, programming of the WCD occurring during activation with the present carrier, etc.

In conditions of poor signal metrics (as measured in step 518), the manager 102 can schedule steps 502/506 so that the WCD necessarily completes step 504 in time to receive the broadcast-paging message prior to the call-paging signal. This, of course, would be followed by receipt of the call-paging message itself and then the next broadcast-paging message. In this way, the WCD obtains two broadcast-paging messages and the single call-paging message in minimal time. If signal metrics are especially poor, the manager 102 may choose to gather the broadcast-page message two, three, or even more times prior to the next call-paging message, utilizing the most efficient combination of pre- and post-call-paging message partitions.

The labeling of signal metrics as "poor" or "good" may involve comparing signal metrics to a predetermined threshold, using a moving average, reviewing historical data specific to the subject WCD, or any other useful technique.

The foregoing planning is conducted by the manager 102 programming the timer 115 to wakeup at the appropriate time, and/or writing machine-readable instructions to the storage 117. Such instructions may comprise software, address settings, flags, or any other appropriate indicia for subsequent retrieval and use by the manager 102 during the next performance of step 506.

After step 520, the manager 102 directs the appropriate components of the WCD, including itself if applicable, to enter the reduced-power sleep state (step 522).

OTHER EMBODIMENTS

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The word "exemplary" is used herein to mean "serving as an example, instance, or illustration." Any embodiment described herein as "exemplary" is not necessarily to be construed as preferred or advantageous over other embodiments.

What is claimed is:

1. A method for communicating paging messages to wireless communications devices of a wireless communications network, where the network responds to each incoming call placed to a wireless communications device by transmitting a call-paging message within a corresponding partition of a digital radio frame of prescribed format, the method comprising operations of:
   responsive to each occurrence of a specified broadcast event:
      transmitting a repeating broadcast-paging message announcing the availability of broadcast content from the network, and
      transmitting the broadcast-paging message multiple times within each digital radio frame; and
   responsive to each occurrence of a first broadcast event associated with a first set of one or more broadcast programs, transmitting a first repeating broadcast-paging message announcing the availability of broadcast content related to the first set of broadcast programs.

2. The method of claim 1, further comprising:
   responsive to each occurrence of a second broadcast event associated with second set of one or more broadcast programs, transmitting a second repeating broadcast-paging message announcing the availability of broadcast content related to the second set of broadcast programs.

3. The method of claim 1, wherein the broadcast-paging message comprises a binary signal indicating whether or not broadcast content is available from the network.

4. The method of claim 1, wherein one type of broadcast event comprises base station receipt of network-assigned instructions to notify wireless communication devices of one or more particular broadcast programs.

5. The method of claim 1, wherein one type of broadcast event comprises the base station upon querying the network learning that one or more unannounced broadcast programs are available from the network.

6. The method of claim 1, wherein one type of broadcast event comprises the base station upon querying the network learning that the network has designated one or more previously announced broadcast programs for re-announcement.

7. A non-transitory computer-readable medium tangibly embodying a program of machine-readable instructions executable by a digital data processor to perform operations for communicating paging messages to wireless communications devices of a wireless communications network, where the network responds to each incoming call placed to a wireless communications device by transmitting a call-paging message within a corresponding partition of a digital radio frame of prescribed format, the method including operations of:
   responsive to each occurrence of a broadcast event,
      transmitting a repeating broadcast-paging message announcing the availability of broadcast content from the network, and
      transmitting the broadcast-paging message multiple times within each digital radio frame; and
   responsive to each occurrence of a first broadcast event associated with a first set of one or more broadcast programs, transmitting a first repeating broadcast-paging message announcing the availability of broadcast content related to the first set of broadcast programs.

8. The non-transitory computer-readable medium of claim 7, further comprising:
   responsive to each occurrence of a second broadcast event associated with second set of one or more broadcast programs, transmitting a second repeating broadcast-paging message announcing the availability of broadcast content related to the second set of broadcast programs.

9. The non-transitory computer-readable medium of claim 7, wherein the broadcast-paging message comprises a binary signal indicating whether or not broadcast content is available from the network.

10. The non-transitory computer-readable medium of claim 7, wherein the broadcast event comprises at least one broadcast event type selected from a group of broadcast event types comprising:
   base station receipt of network-assigned instructions to notify wireless communication devices of one or more particular broadcast programs;
   the base station, upon querying the network, learning that one or more unannounced broadcast programs are available from the network; and
   the base station, upon querying the network, learning that the network has designated one or more previously announced broadcast programs for re-announcement.

11. Circuitry comprising:
    multiple interconnected electrically conductive elements configured to perform operations for communicating paging messages to wireless communications devices of a wireless communications network, where the network responds to each incoming call placed to a wireless communications device by transmitting a call-paging message within a corresponding partition of a digital radio frame of prescribed format, the method including operations of:
    responsive to each occurrence of a broadcast event,
       transmitting a repeating broadcast-paging message announcing the availability of broadcast content from the network, and
       transmitting the broadcast-paging message multiple times within each digital radio frame; and
    responsive to each occurrence of a first broadcast event associated with a first set of one or more broadcast programs, transmitting a first repeating broadcast-paging message announcing the availability of broadcast content related to the first set of broadcast programs.

12. The circuitry of claim 11, further comprising;
    responsive to each occurrence of a second broadcast event associated with second set of one or more broadcast programs, transmitting a second repeating broadcast-paging message announcing the availability of broadcast content related to the second set of broadcast programs.

13. The circuitry of claim 11, wherein the broadcast-paging message comprises a binary signal indicating whether or not broadcast content is available from the network.

14. The circuitry of claim 11, wherein the broadcast event comprises at least one broadcast event type selected from a group of broadcast event types comprising:
- base station receipt of network-assigned instructions to notify wireless communication devices of one or more particular broadcast programs;
- the base station, upon querying the network, learning that one or more unannounced broadcast programs are available from the network; and
- the base station, upon querying the network, learning that the network has designated one or more previously announced broadcast programs for re-announcement.

15. A base station apparatus for use in a wireless communications network that responds to each incoming call placed to a wireless communications device by transmitting a call-paging message within a corresponding partition of a digital radio frame of prescribed format, the base station comprising:
- one or more antennas;
- a transceiver;
- a digital data processor programmed to communicate paging messages to wireless communications devices by performing operations including:
  - responsive to each occurrence of a broadcast event,
    - transmitting a repeating broadcast-paging message announcing the availability of broadcast content from the network, and
    - transmitting the broadcast-paging message multiple times within each digital radio frame; and
  - responsive to each occurrence of a first broadcast event associated with a first set of one or more broadcast programs, transmitting a first repeating broadcast-paging message announcing the availability of broadcast content related to the first set of broadcast programs.

16. The base station apparatus of claim 15, further comprising:
- responsive to each occurrence of a second broadcast event associated with second set of one or more broadcast programs, transmitting a second repeating broadcast-paging message announcing the availability of broadcast content related to the second set of broadcast programs.

17. The base station apparatus of claim 15, wherein the broadcast-paging message comprises a binary signal indicating whether or not broadcast content is available from the network.

18. The base station apparatus of claim 15, where the broadcast event comprises at least one broadcast event type selected from a group of broadcast event types comprising:
- base station receipt of network-assigned instructions to notify wireless communication devices of one or more particular broadcast programs;
- the base station, upon querying the network, learning that one or more unannounced broadcast programs are available from the network; and
- the base station, upon querying the network, learning that the network has designated one or more previously announced broadcast programs for re-announcement.

19. A base station apparatus for use in a wireless communications network that responds to each incoming call placed to a wireless communications device by transmitting a call-paging message within a corresponding partition of a digital radio frame of prescribed format, the base station comprising:
- antenna means for relaying signals between conductive media and air media;
- means for transceiving;
- digital data processor means for communicating paging messages to wireless communications devices by performing operations including:
  - responsive to each occurrence of a broadcast event,
    - transmitting a repeating broadcast-paging message announcing the availability of broadcast content from the network, and
    - transmitting the broadcast-paging message multiple times within each digital radio frame; and
  - responsive to each occurrence of a first broadcast event associated with a first set of one or more broadcast programs, transmitting a first repeating broadcast-paging message announcing the availability of broadcast content related to the first set of broadcast programs.

20. A wireless communications network that responds to each incoming call placed to a wireless communications device by transmitting a call-paging message within a corresponding partition of a digital radio frame of prescribed format, the network comprising:
- multiple base stations;
- wireless communications network equipment shared by multiple base stations;
- wherein at least one of the base stations and network facilities is programmed to communicate paging messages to wireless communications devices by performing operations including:
- responsive to each occurrence of a broadcast event,
  - transmitting a repeating broadcast-paging message announcing the availability of broadcast content from the network, and
  - transmitting the broadcast-paging message multiple times within each digital radio frame; and
- responsive to each occurrence of a first broadcast event associated with a first set of one or more broadcast programs, transmitting a first repeating broadcast-paging message announcing the availability of broadcast content related to the first set of broadcast programs.

* * * * *